A. D. RAY.
TRACTOR.
APPLICATION FILED AUG. 5, 1918.

1,356,658.

Patented Oct. 26, 1920.
2 SHEETS—SHEET 2.

Inventor
ALBERT D. RAY
By Lucius P. Griswold
Atty.

UNITED STATES PATENT OFFICE.

ALBERT D. RAY, OF CLEVELAND, OHIO, ASSIGNOR OF ONE-HALF TO GEORGE W. KINZEL, OF CLEVELAND, OHIO.

TRACTOR.

1,356,658.   Specification of Letters Patent.   Patented Oct. 26, 1920.

Application filed August 5, 1918. Serial No. 248,376.

*To all whom it may concern:*

Be it known that I, ALBERT D. RAY, a citizen of the United States, residing at Cleveland, in the county of Cuyahoga and State of Ohio, have invented certain new and useful Improvements in Tractors, of which the following is a specification.

This invention relates in general to motor vehicles of the tractor type used for general farm work, and it has particular reference to a motor cycle tractor, that is to say, a tractor constructed along the lines of a motor cycle, or a construction that is adaptable to the various types of motor cycles at present in common use, for converting the motor cycle into a vehicle that will perform all the functions required of a farm tractor.

Among the objects of the present invention are:—First, the provision of a durable, economical, non-cumbersome tractor. Second, to provide means for easily and quickly changing the tires of the traction wheels whereby a smooth tread, or a toothed gripping tread may be used. Third, the provision of a light, rigid frame construction that allows suitable lateral and vertical clearance when the vehicle is used in connection with, or as a consort for a cultivator or similar implement. Fourth, to provide simple and efficient transmission and steering mechanism, and, fifth, to provide for converting a motor cycle into a tractor.

In view of the above and other objects and advantages which will become apparent, the invention consists in the construction, combination and arrangement of the parts as described in the following specification and definitely set forth in the appended claims. In the description reference is had to the accompanying drawings which form a part of the specification, and in which similar reference characters are employed to designate corresponding parts.

In said drawings Figure 1 is a side elevation of an embodiment of the improved tractor, with a portion of the rear wheels broken away.

Figure 1:
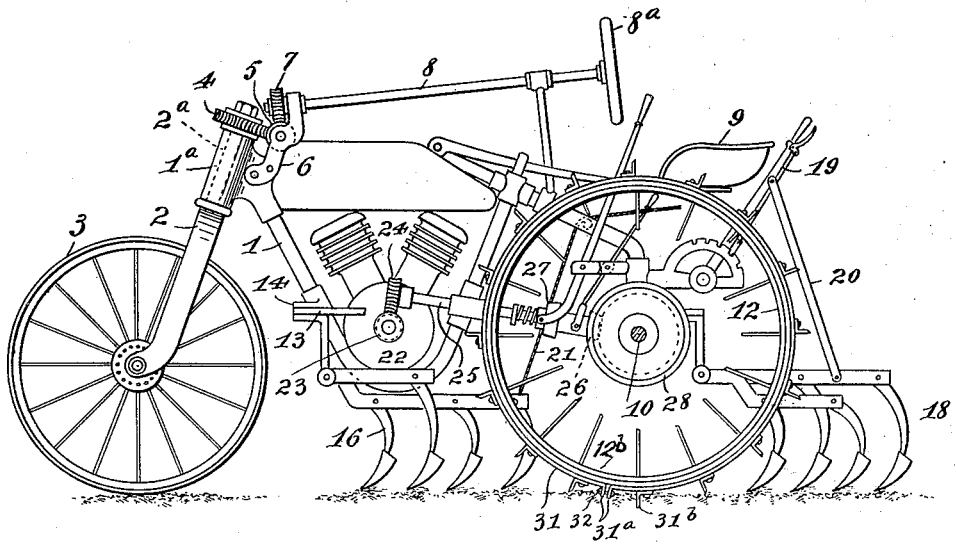
Figure 2:
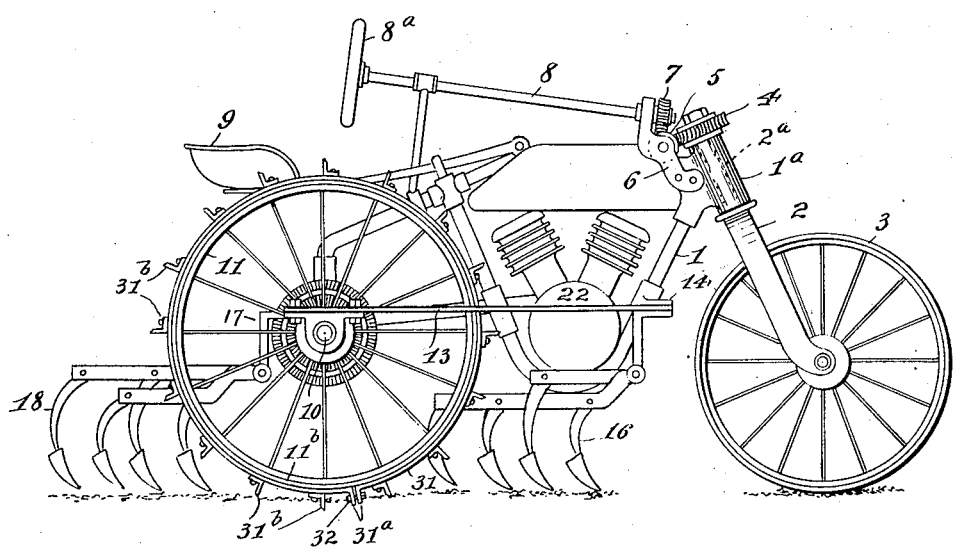
Fig. 2 is an elevation taken from the opposite side to that shown in Fig. 1.

The present invention provides a frame 1, which may be of especial design adapted to accommodate the coöperating elements that are embodied in the complete tractor, or any common type of motor-cycle frame may be employed, suitable alterations being made in said motor-cycle frame for its adaptation to the combination and general construction of the improved tractor. The frame 1 is provided with a head $1^a$ in which is journaled the stem $2^a$ of the steering fork 2, the guide wheel 3 being mounted in said fork. The tractor is guided by means of a chain of spiral gears arranged and operated as follows. A spiral gear 4 is keyed or otherwise fixed to the stem $2^a$. Said gear 4 is in mesh with a companion gear 5 mounted in a bracket 6 attached to the frame, and the gear 5 is in mesh with a spiral gear 7 rigidly attached to a steering rod 8, said rod being mounted in suitable bearings, and provided with a hand wheel $8^a$ located convenient to the operator when occupying the seat 9, said seat being connected with the frame of the machine.

A rear axle 10 is provided, said axle having a fixed or rigid connection with the main frame 1 and extending laterally therefrom on both sides. Mounted on the axle 10 are traction wheels 11 and 12, the wheel 11 being an idler while wheel 12 is driven by the motor, as presently explained.

Figure 3:
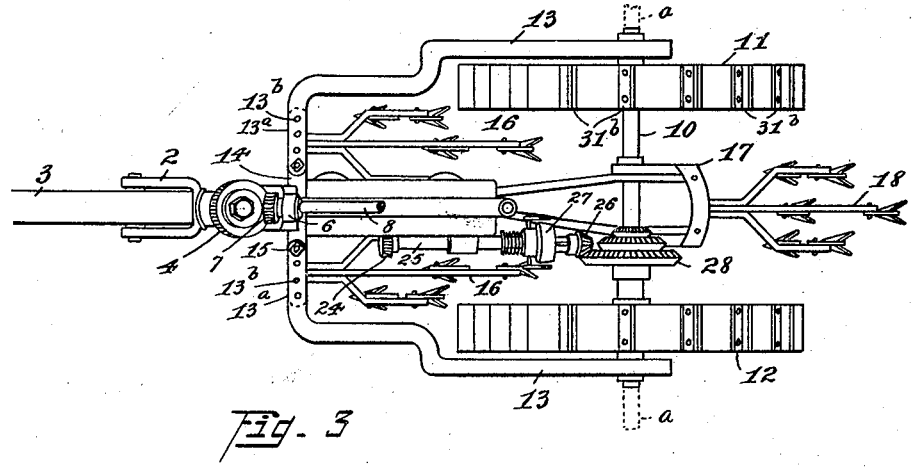
Fig. 3 is a top plan with certain parts eliminated.
Figure 4:
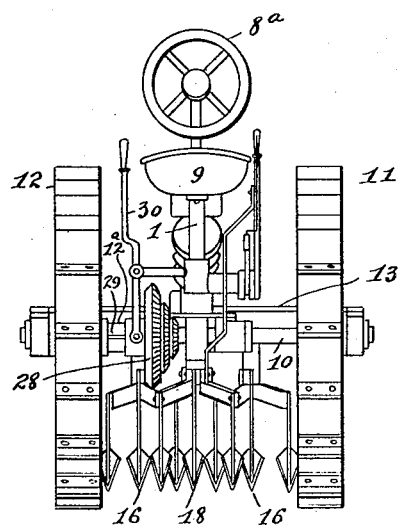
Fig. 4 is a rear end view.

An adjustable auxiliary frame is provided, said frame comprising horizontally arranged out-rigger members 13 having their forward ends $13^a$ attached to a flanged bracket 14 connected with the main frame. The members 13 extend rearward outside of the traction wheels 11 and 12, and are connected with the axle 10. Provision is made for contracting and expanding the auxiliary frame laterally, and for this purpose registering bolt holes $13^b$ and $14^b$ are provided, respectively, in the members 13 and the flanges of the bracket 14. The axle 10 may be extended as shown by broken lines $a$ in Fig. 3, and the forward ends of members 13 shifted to the desired position and made fast by bolts 15 in the holes $13^b$ and $14^b$. The auxiliary frame 13, thus arranged, imparts rigidity to the vehicle structure, and also provides for the attachment of auxiliary implements, such as cultivators 16.

A second auxiliary frame 17 is connected with the main frame and provides for the attachment of cultivator members 18. The operation of the cultivators or other auxiliary implements is controlled by the operator from the seat 9, suitable means being provided therefor. In the embodiment illustrated, the rear cultivator 18 is raised or lowered by means of the hand-lever 19 connected with said cultivator by the rod 20. The forward cultivators 16 are shown as operated by a cable 21, but it is obvious that suitable lever mechanism may be employed for this purpose.

The vehicle is driven by the engine 22, the driving shaft of which carries a spiral gear 23 in mesh with a companion gear 24 on the shaft 25. A bevel gear 26 is driven by the shaft 25 through an interposed clutch 27. The gear 26 is adapted to mesh with the three-step bevel gear 28, whereby different speeds may be obtained. The extended hub $12^a$ of the traction wheel 12 is provided with a feather key 29, and the gear 28 is adapted to slide longitudinally on said key, the sliding movement being controlled by the lever 30. The gear 26 is also longitudinally adjustable on the shaft 25, for the purpose of coöperating with the three steps of the gear 28, suitable means being provided for shifting said gear 26. Both traction wheels are laterally adjustable on the axle 10.

Removable tires are provided for the traction wheels 11 and 12. These tires comprise tread bands 31, adapted to circumscribe the rims $12^b$ and $11^b$, being clamped rigidly on the peripheries of said rims by suitable means, as for example, bolts 32 operating in out-turned lips or flanges $31^a$, for drawing the members 31 taut around the rims $11^b$ and $12^b$. Traction members $31^b$ are attached at intervals to the outer peripheries of the members 31. The advantage of the removable traction tires is obvious, inasmuch as it is objectionable to operate vehicles having rigid gripping or puncturing devices on the peripheries of their wheels, on the highways or improved roads throughout the country, while such devices are practically a necessity when operating the vehicle on soft ground. In my improved construction the traction tires are employed when the vehicle and consorts are used for plowing, cultivating, or similar field functions, but when it is desired to utilize the vehicle for hauling produce to market, the traction tires are easily and quickly removed leaving smooth wheel tires that do not damage the road.

Figure 5:
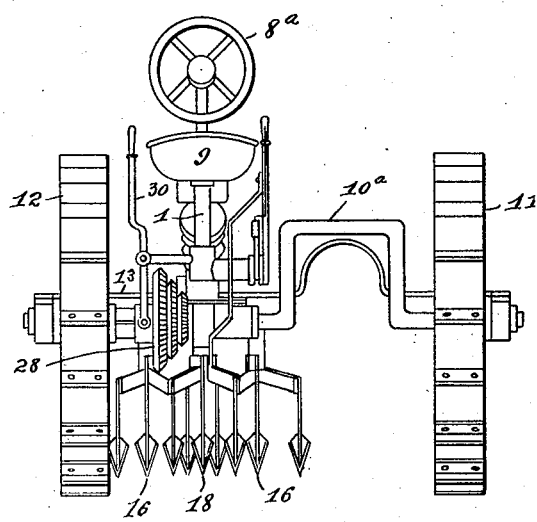
Fig. 5 is a similar view showing a modified rear axle.

Fig. 5 illustrates the tractor with a laterally extended rear wheel base, providing an axle having an arch $10^a$, whereby increased head clearance is obtained.

The foregoing description, in connection with the accompanying drawings, sets forth the general principles of my improved tractor, it will however be understood that in the reduction to practice there will, no doubt, be many changes in details of construction, design and relative arrangement of elements, that can be made without departure from the spirit of the invention. Therefore I am not confined to this specification only so far as the limitation of the following claims.

Having now described my invention, what I claim and desire to secure by Letters Patent is.

1. In a tractor, the combination of a motor cycle frame; a motor carried on said frame; a steering member mounted forward in said frame; a pilot wheel carried by said steering member; co-acting spiral gears for oscillating said steering member; a steering rod for manually operating said spiral gears; a rear axle connected with the frame; traction wheels mounted on said axle; a series of beveled variable speed gears attached to the hub of one of the traction wheels; a drive shaft having spiral gear connection with the motor; a bevel pinion carried by said shaft, said bevel pinion being adapted to mesh with the bevel gears on the traction wheel hub; means for shifting the relation of the bevel gears and pinion; and clutch mechanism for connecting said bevel pinion with the drive shaft.

2. In a tractor, the combination of a motor cycle frame; a motor carried on said frame; a steering member mounted forward in said frame; a pilot wheel mounted on said steering member; co-acting spiral gears for oscillating said steering member; a steering rod for operating said spiral gears; a rear axle connected with the frame; laterally adjustable traction wheels mounted on said axle; an auxiliary frame connected with the main frame and with the rear axle outside of the traction wheels; an extended hub or sleeve on one of the traction wheels; bevel gears of different diameters attached to said sleeve; a drive shaft having spiral gear connection with the motor; a bevel pinion having clutch connection with said drive shaft and adapted to mesh with the bevel gears on the traction sleeve; means for shifting said pinion in its relation to the bevel gears; and means for operating the clutch.

In testimony whereof I affix my signature.

ALBERT D. RAY.